US007214956B2

(12) United States Patent
Imai

(10) Patent No.: US 7,214,956 B2
(45) Date of Patent: May 8, 2007

(54) IMAGE RECORDING MEDIUM

(75) Inventor: Shinji Imai, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 220 days.

(21) Appl. No.: 10/440,252

(22) Filed: May 19, 2003

(65) Prior Publication Data

US 2003/0222233 A1 Dec. 4, 2003

(30) Foreign Application Priority Data

May 30, 2002 (JP) ............................ 2002/157578

(51) Int. Cl.
*G01T 1/24* (2006.01)

(52) U.S. Cl. ...................................................... 250/591

(58) Field of Classification Search ..................... None
See application file for complete search history.

(56) References Cited

U.S. PATENT DOCUMENTS

| | | | | |
|---|---|---|---|---|
| 4,535,468 | A | 8/1985 | Kempter | |
| 6,268,614 | B1 | 7/2001 | Imai | |
| 6,344,370 | B1 * | 2/2002 | Izumi et al. | 438/97 |
| 6,376,857 | B1 | 4/2002 | Imai | |
| 6,469,312 | B2 * | 10/2002 | Agano | 250/580 |
| 6,552,356 | B2 * | 4/2003 | Imai | 250/580 |
| 6,617,604 | B2 * | 9/2003 | Imai | 250/591 |
| 6,818,913 | B2 * | 11/2004 | Yasuda et al. | 250/586 |
| 7,018,790 | B2 * | 3/2006 | Kashiwagi et al. | 430/619 |
| 7,022,424 | B2 * | 4/2006 | Kamisawa | 428/840.1 |
| 2001/0025937 | A1 * | 10/2001 | Imai | 250/591 |
| 2003/0010943 | A1 * | 1/2003 | Imai | 250/580 |
| 2004/0104362 | A1 * | 6/2004 | Imai | 250/582 |

FOREIGN PATENT DOCUMENTS

| | | |
|---|---|---|
| EP | 0 622 708 A2 | 11/1994 |
| EP | 0 898 421 A2 | 2/1999 |

* cited by examiner

*Primary Examiner*—Otilia Gabor
(74) *Attorney, Agent, or Firm*—Sughrue Mion, PLLC

(57) ABSTRACT

In an electrostatic recorder including: a first electrode for transmitting radioactive rays; a recording photoconductive layer irradiated with the radioactive rays to generate charge; a charge transportation layer; a storage unit for storing the charge as an electrostatic latent image; a reading photoconductive layer irradiated with a reading light to generate charge; and a second electrode, the first electrode, the recording photoconductive layer, the charge transportation layer, the storage unit, the reading photoconductive layer, and the second electrode are laminated in this sequential order. The electrostatic recorder further includes a suppression layer provided between the reading photoconductive layer and the second electrode to prevent interfacial crystallization generated in the reading photoconductive layer. In the electrostatic recorder, the interfacial crystallization of the reading photoconductive layer is prevented without reducing reading efficiency. As the material of the suppression layer, polyvinyl alcohol which is an organic polymer having an OH group is used.

2 Claims, 2 Drawing Sheets

IMAGE RECORDING MEDIUM

BACKGROUND OF THE INVENTION

1. Field of the Invention

The present invention relates to an image recording medium in which image information can be recorded as an electrostatic latent image.

2. Description of the Related Art

Conventionally, a method has been known which uses, as an image recording medium having a storage unit for storing the amount of charge as latent image charge in accordance with an irradiated electromagnetic wave for recording. For example, in medial radiation photography, a radiation image recording medium (electrostatic recorder) having a photoconductor such as a selenium plate that is sensitive to radioactive rays such as X rays, is used as a photoreceptor. Then, radiation image information is recorded as an electrostatic image by irradiating the radiation image recording medium with X rays and storing the amount of charge in a storage unit in the radiation image recording medium in accordance with a dose of the radiated X rays. Concurrently, the radiation image information is read out from the radiation image recording medium by scanning the radiation image recording medium in which the radiation image information has been recorded by a laser beam or a line light (e.g., U.S. Pat. No. 4,535,468 etc.). By utilizing the radiation image recording medium, it is possible to reduce a dosage of radiation exposure for a subject, as well as improve diagnostic performance etc.

A radiation image recording medium which is capable of high-speed reading response and efficient signal charge taking-out simultaneously, a recording method and a recording device for recording radiation image information on the radiation image recording medium, and a reading method and a reading device for reading out the radiation image information from the radiation image recording medium, have been disclosed in U.S. Pat. No. 6,268,614, U.S. Pat. No. 6,376,857 etc.

In the U.S. Pat. No. 6,268,614 etc., a method and a device for radiation image recording/reading are described, which use a radiation image recording medium constituted by laminating: a first electrode layer for transmitting radioactive rays for recording or a light emitted by the excitation of the radioactive rays; a recording photoconductive layer that exhibits conductivity by being irradiated with the radioactive rays or the light; a charge transportation layer operating as a substantial insulator for latent image charge and as a substantial conductor for transport charge of a polarity reverse to that of the latent image charge; a reading photoconductive layer that exhibits conductivity by being irradiated with an electromagnetic wave for reading; and a second electrode layer for transmitting the reading electromagnetic wave, in this sequential order. The method and the device for radiation image recording/reading also irradiate the first electrode layer of the radiation image recording medium with radioactive rays for recording, record radiation image information as an electrostatic latent image by storing the amount of charge according to a dose of the radiated radioactive rays, in a storage unit formed in a substantial interface between the recording photoconductive layer and the charge transportation layer, and obtain the radiation image information by reading the recorded electrostatic latent image by irradiation with the reading electromagnetic wave.

Further, there has also been proposed a radiation image recording medium where the second electrode layer is a stripe electrode constituted by arraying a number of linear electrodes for transmitting the reading electromagnetic wave in a stripe shape. In this radiation image recording medium, since the latent image charge can be concentrated and stored in the storage unit in accordance with each linear electrode of the stripe electrode, image sharpness can be improved.

In the aforementioned radiation image recording medium, DC voltage is applied so that the first electrode layer can be set to a negative potential and the second electrode layer can be set to a positive potential. Radioactive rays transmitted through an object are irradiated to the first electrode layer. The irradiation of the radioactive rays that have been transmitted through the first electrode layer generates charge pairs in the recording photoconductive layer in accordance with a dose of the radioactive rays. Negative charges are stored as latent image charges in the storage unit, and a radiation image is recorded as an electrostatic image.

When the reading electromagnetic wave is irradiated to the second electrode layer of the radiation image recording medium, this electromagnetic wave is transmitted through the second electrode layer to irradiate the reading photoconductive layer. As a result, charge pairs are generated in the reading photoconductive layer. Positive charges of the charge pairs are passed through the charge transportation layer to be coupled with the negative charges stored in the storage unit, then the negative charges are coupled again with the positive charges applied to the second electrode layer, whereby generating electrical discharge. This discharging causes a voltage change between the first electrode layer and the second electrode layer. Then, an electrostatic image is read by detecting the voltage change as a current change with a current detection amplifier or the like.

The reading photoconductive layer in the radiation image recording medium is made of a-Se (amorphous selenium) in most cases because of advantages of high dark resistance and a high reading response speed. However, in a selenium film in an amorphous state, interfacial crystallization progresses during a deposition process of film formation, at interfaces with other materials to increase charge injection from the electrode, consequently causing a problem of S/N reduction. If a transparent oxide film, particularly ITO, is used as an electrode material, interfacial crystallization conspicuously progresses in an interface between the electrode material and a-Se.

Thus, to prevent the problem of the interfacial crystallization in the reading photoconductive layer, there has been proposed a provision of a suppression layer made of an organic polymer for suppressing interfacial crystallization between the electrode layer irradiated with a reading light and the reading photoconductive layer.

However, if the suppression layer is formed between the electrode layer irradiated with the reading electromagnetic wave and the reading photoconductive layer, there is a drawback that interference occurs with coupling between negative charge generated in the reading photoconductive layer during reading and positive charge in the electrode irradiated with the reading electromagnetic wave, i.e., a reduction occurs in photoinduction discharging efficiency in the reading photoconductive layer to lower reading efficiency. This reading efficiency reduction is observed conspicuously in a region where irradiation intensity of a recording electromagnetic wave is weak, i.e., a region where photoinduction discharging must be carried out under a low electric field.

SUMMARY OF THE INVENTION

The present invention was made in light of the foregoing circumstances, and it is an object of the invention to provide an image recording medium of the type described above, which is capable of preventing interfacial crystallization in a reading photoconductive layer without reducing reading efficiency.

An image recording medium of the present invention comprises: a first electrode for transmitting an electromagnetic wave for recording; a recording photoconductive layer that exhibits conductivity by being irradiated with the electromagnetic wave for recording; a storage unit for storing charge generated in the recording photoconductive layer; a reading photoconductive layer that exhibits conductivity by being irradiated with an electromagnetic wave for reading; a second electrode for transmitting the electromagnetic wave for reading. The first electrode, the recording photoconductive layer, the storage unit, the reading photoconductive layer, and the second electrode are laminated in this sequential order. The image recording medium further comprises a suppression layer for transmitting the reading electromagnetic wave between the reading photoconductive layer and the second electrode to suppress interfacial crystallization in the reading photoconductive layer, wherein the suppression layer includes an organic polymer having a polar group.

In this case, the "recording electromagnetic wave" means for example radioactive rays or the like, but also includes fluorescent light emitted from a fluorescent material by irradiation of radioactive rays that bear radiation image information.

Preferably, an organic polymer having an OH group or a COOH group as the polar group is used as the material of the suppression layer.

For example, polyvinyl alcohol or the like may be used as the "organic polymer having an OH group", and for example a polyacrylic acid or the like may be used as the "organic polymer having a COOH group". Altered polyvinyl alcohol or the like having both of the OH group and the COOH group may also be used. Additionally, an organic polymer having both of the OH group and a polar group that is different from the OH group may be used. In this case, however, it is preferable to use an organic polymer in which the ratio of the OH group is larger than that of the polar group.

Preferably, an organic polymer in which the ratio of the polar group is in a range of 4 to 40 wt % is used as the material of the suppression layer.

The image recording medium of the present invention includes not that which is made of the aforementioned layers but also that which further comprises an additional layer such as a charge transportation layer provided on top of the aforementioned layers.

According to the image recording medium of the present invention, since the suppression layer made of the organic polymer having the polar group is provided between the reading photoconductive layer and the second electrode irradiated with the reading electromagnetic wave, it is possible to suppress interfacial crystallization in the reading photoconductive layer without reducing reading efficiency.

FIG. 2 shows experimental data of reading efficiency when polyvinyl alcohol having a polar group (OH group) (ratio of the OH group is 18 wt %) is used as the material of the suppression layer, as well as experimental data of reading efficiency when polycarbonate having no polar groups is used as the material of the suppression layer. From FIG. 2, it can be understood that the use of the polyvinyl alcohol as the material of the suppression layer improves the reading efficiency.

DESCRIPTION OF THE PREFERRED EMBODIMENTS

Figure 1A:
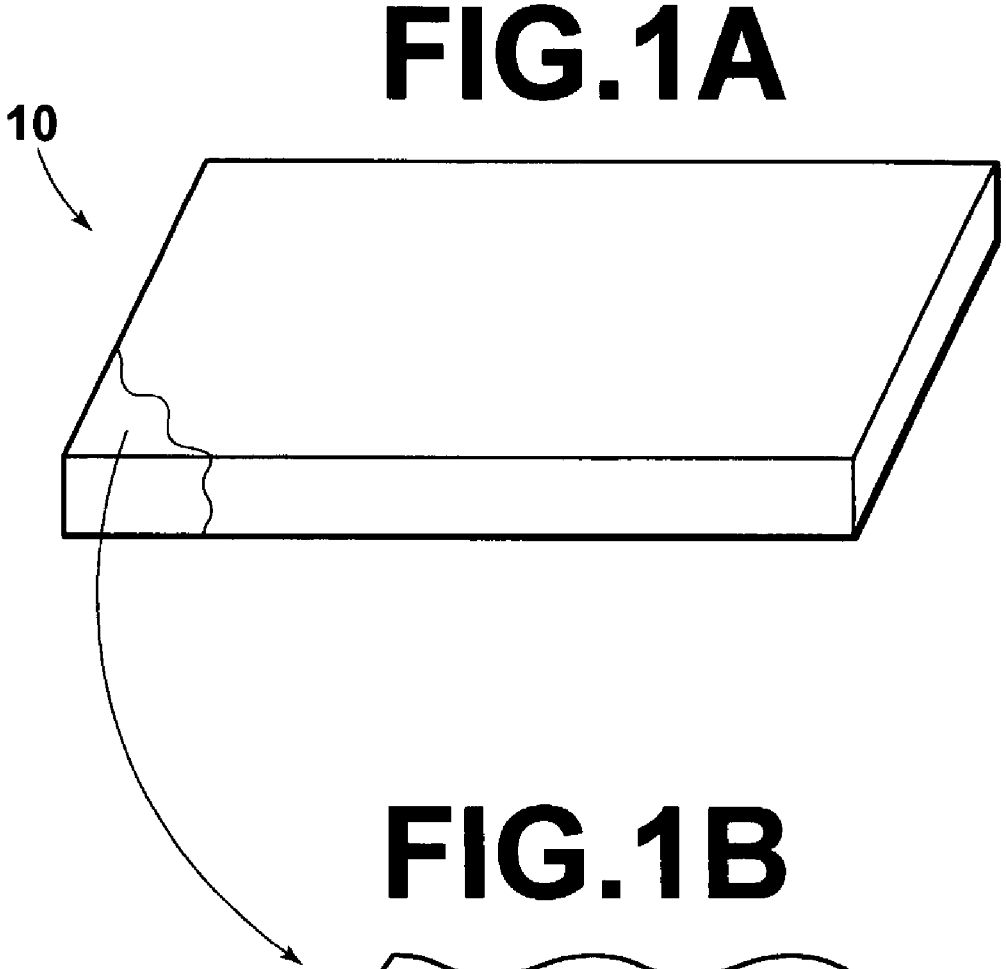
FIG. 1A is a perspective view of an electrostatic recorder to which an image recording medium of the present invention is applied.
Figure 1B:
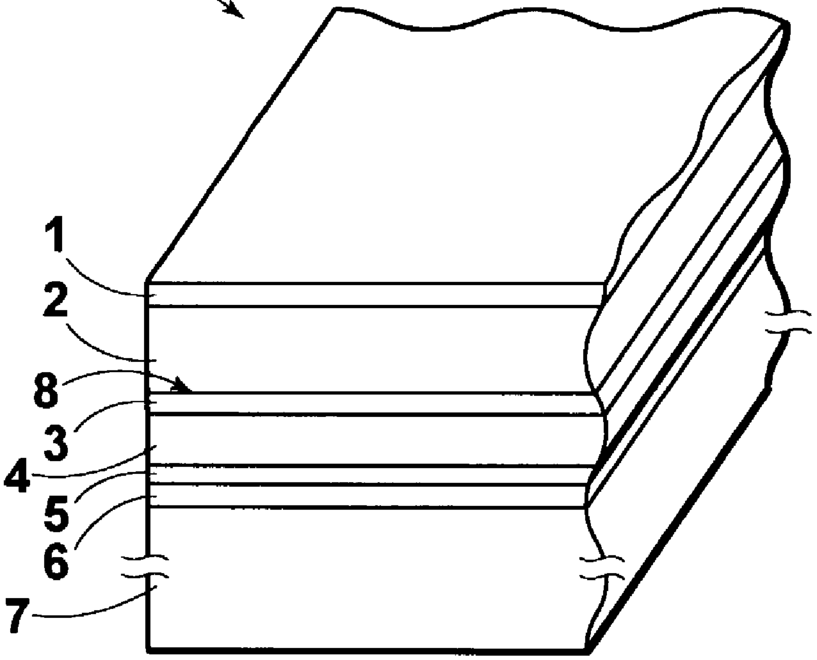
FIG. 1B is a partial sectional view of FIG. 1A.
Figure 2:
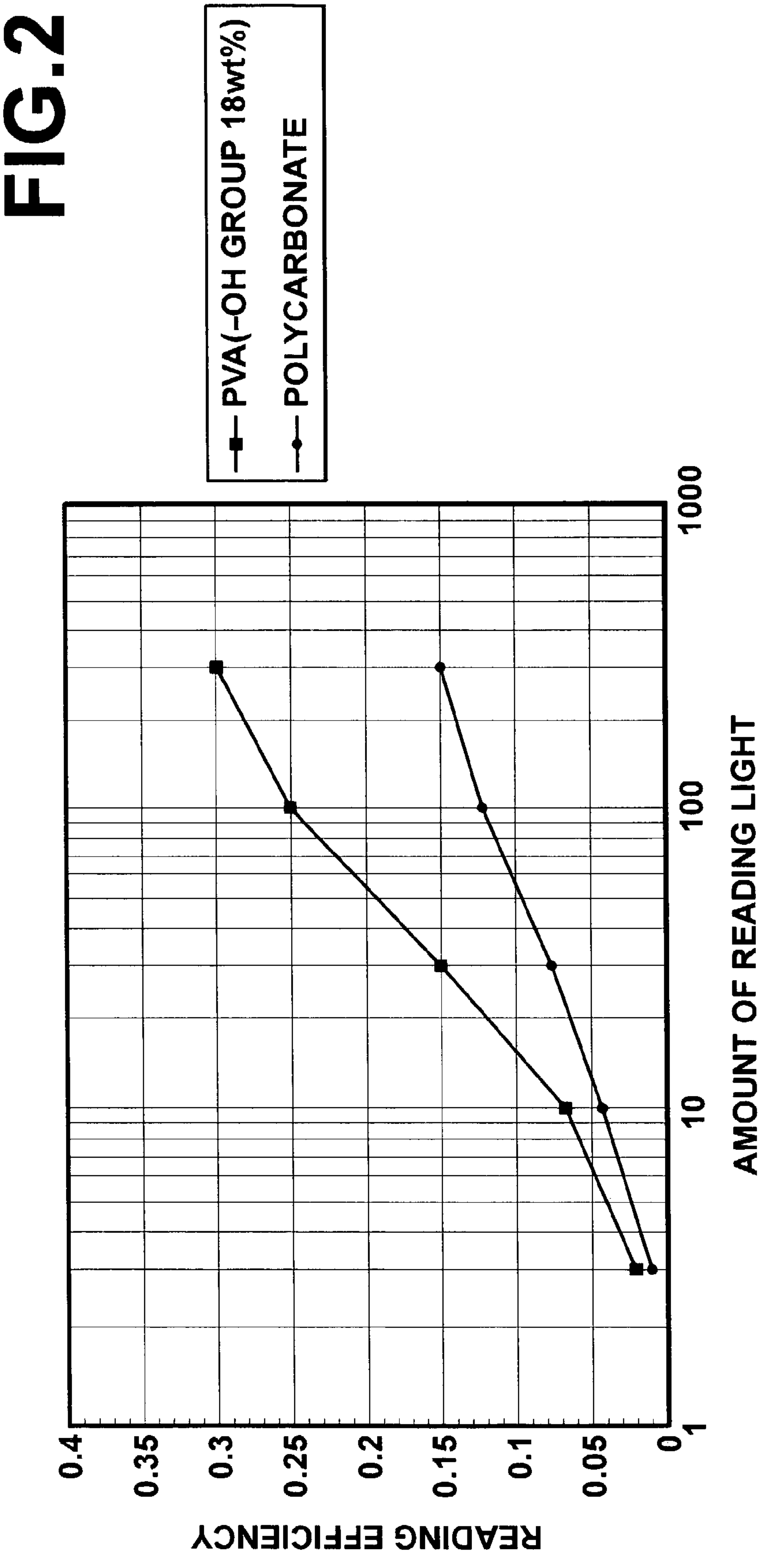
FIG. 2 is a view showing experimental data of reading efficiency when polyvinyl alcohol is used as the material of a suppression layer, and experimental data of reading efficiency when polycarbonate is used.

Next, the preferred embodiment of the present invention will be described with reference to the accompanying drawings. FIGS. 1A and 1B are schematic constitutional views of an electrostatic recorder to which an embodiment of an image recording medium of the present invention is applied: FIG. 1A is a perspective view of the electrostatic recorder, and FIG. 1B is a partial sectional view of FIG. 1A.

An electrostatic recorder 10 of the embodiment is constituted by laminating a first electrode 1 for transmitting a recording light (e.g., radioactive rays such as X rays), a recording photoconductive layer 2 that exhibits conductivity by being irradiated with the recording light transmitted through the first electrode, a charge transportation layer 3 operating as a substantial insulator for charge applied to the first electrode 1 and as a substantial conductor for charge of a polarity reverse to that of the latent image polarity charge, a reading photoconductive layer 4 that exhibits conductivity by being irradiated with a reading light (e.g., blue color region light having a wavelength of 550 nm or lower), a suppression layer 5 that is transmissive to the reading light and suppresses interfacial crystallization in the reading photoconductive layer 4, a second electrode 6 for transmitting the reading light, and a substrate 7 for transmitting the reading light, in this sequential order. The electrostatic recorder 10 of the embodiment has a storage unit 8 in an interface between the recording photoconductive layer and the charge transportation layer, for storing the latent image polarity charge generated in the recording photoconductive layer 2.

For the first and second electrodes 1 and 6, any materials can be used as long as they transmit a recording light or a reading light. For example, a nesa film ($SnO_2$), indium tin oxide (ITO), Idemitsu indium X-metal oxide (IDIXO; by Idemitsu Kosan INC.) which is an amorphous light transmissive oxide film or the like can be used by being formed to a thickness of 50 to 200 nm. If X rays are used as a recording light and the X rays are irradiated from the first electrode 1 side to record an image, since transmissivity to a visible light is not necessary, Al or Au of a thickness 100 nm, for example, can be thus used for the first electrode 1.

The first and second electrodes 1 and 6 may be constituted of only electrodes as a whole as shown in the embodiment (so-called flat plate electrode), or for example a stripe electrode where linear electrodes are arrayed in a direction orthogonal to its longitudinal direction.

The recording photoconductive layer 2 may be formed of any material as long as it exhibits conductivity by being irradiated with the recording light. For example, a photoconductive material having as a main component thereof at least one of lead oxide (II) or lead iodide (II) such as a-Se, PbO, or $PbI_2$, and $Bi_{12}$ (Ge, Si) $O_{20}$, $Bi_2I_3$/organic polymer nanocomposite is appropriate. According to the embodiment, a-Se is used which, advantageously, has relatively high quantum efficiency for radioactive rays and high dark resistance.

A thickness of the recording photoconductive layer 2 having a-Se as its main component is preferably set in a range of 50 μm through 1000 μm in order to sufficiently absorb the recording light.

For the charge transportation layer 3, a larger difference between mobility of negative charge applied to the first electrode and mobility of positive charge which becomes a polarity reverse to that of the former is better (e.g., $10^2$ or higher, preferably $10^3$ or higher). An organic compound such as poly N-vinylcarbazole (PVK), N, N'-diphenyl-N, N'-bis (3-methylphenyl)-[1, 1'-(byphenyl)-4, 4'-diamine (TPD) or a discotheque liquid crystal, a TPD polymer (polycarbonate, polystyrene, PVK) dispersoid, or a semiconductor material such as a-Se doped with 10 to 200 ppm of C1 is appropriate.

The reading photoconductive layer 4 is made of a photoconductive material that exhibits conductivity by being irradiated with the reading light, with a-Se as its main component.

The suppression layer 5 prevents a chemical change of Se in an interface by preventing direct contact between the electrode material of the second electrode and a-Se of the reading photoconductive layer, and thereby suppresses interfacial crystallization.

If the suppression layer 5 is provided as described above, while the interfacial crystallization can be suppressed in the reading photoconductive layer 4, some materials may cause a reduction in photoinduction discharging efficiency in the reading photoconductive layer, consequently lowering reading efficiency. Thus, according to the embodiment, a material having a polar group is used for the suppression layer 5 so as to prevent such adverse effects. For example, polyvinyl alcohol (PVA) is used as the material of the suppression layer 5. The polyvinyl alcohol is an organic polymer having an OH group and, in the embodiment, polyvinyl alcohol where a ratio of the OH group is 18 wt % is used.

In the embodiment, the polyvinyl alcohol is used as the material of the suppression layer 5. However, a vinyl acetate/polyvinyl alcohol copolymer, a vinyl chloride/vinyl acetate/polyvinyl alcohol copolymer, etc. may be used. Alternatively, an organic polymer or gelatin having an OH group other than polyvinyl alcohol may be used. An organic polymer having a polar group not limited to the OH group, e.g., a COOH group, may be used. As the polar group, there are —COOX (X is H or alkaline metal, same hereinafter), $—OSO_3X$, $—SO_3X$, $—PO(OX)_2$, —CN, —SH, $—CH_2OCH_2$, —CI, —CONH, —NHCOO—, $—NH_2$, $—N+H_3$, and a group represented by the following chemical formula:

(1)

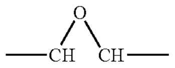

As organic polymers having polar groups similar to the above, for example, there are polyether, polyurethane, polyamide, polyester, cellulose, protein, starch, a polyacrylic acid, polyacrylic acid ester, polyvinyl acetate, polyvinylalkylal, an epoxy resin, polyacrylonitrile, and silicon resin.

As the material of the suppression layer 5, preferably, a material having elasticity for reducing thermal stress in addition to the aforementioned characteristics is used. Further, the suppression layer 5 preferably functions to tightly fix and reinforce the reading photoconductive layer 4 and the second electrode 6.

For the substrate 7, a material that is deformable in accordance with an environmental temperature change, in addition to its transparency with respect to the reading light, is used. Further, in this material to be used, a thermal expansion coefficient of the substrate 7 is within one in several to severalfold of a thermal expansion coefficient of a material of the reading photoconductive layer 4, preferably thermal expansion coefficients of both are relatively close to each other.

According to the electrostatic recorder 10 of the embodiment, since the suppression layer whose material is the polyvinyl alcohol, which is the organic polymer having the polar group, is provided between the reading photoconductive layer 4 and the second electrode 6 irradiated with the reading light, it is possible to suppress interfacial crystallization in the reading photoconductive layer 4 without reducing the reading efficiency.

What is claimed is:

1. An image recording medium comprising:

a first electrode for transmitting an electromagnetic wave for recording;

a recording photoconductive layer that exhibits conductivity by being irradiated with the electromagnetic wave for recording to exhibit conductivity;

a storage unit for storing charge generated in the recording photoconductive layer;

a reading photoconductive layer that exhibits conductivity by being irradiated with an electromagnetic wave for reading to exhibit conductivity;

a second electrode for transmitting the electromagnetic wave for reading, the first electrode, the recording photoconductive layer, the storage unit, the reading photoconductive layer and the second electrode being laminated in this sequential order; and a suppression layer for transmitting the reading electromagnetic wave between the reading photoconductive layer and the second electrode to suppress interfacial crystallization in the reading photoconductive layer, wherein the suppression layer includes an organic polymer having a polar group, wherein a ratio of the polar group in the organic polymer is in a range of 4 to 40 wt%, and wherein the polar group is one of an OH group and a COOH group.

2. The image recording medium according to claim 1, wherein the suppression layer includes polyvinyl alcohol.

* * * * *